March 1, 1966  J. W. MEINHERZ ETAL  3,237,746
TYPEWRITER DRIVE CAM HAVING ROUNDED ENGAGING SURFACE
Filed June 22, 1962  7 Sheets-Sheet 4

Fig. 5

INVENTORS
JOACHIM W. MEINHERZ
HARALD KOCH

BY Percy P. Lantzy
ATTORNEY

March 1, 1966  J. W. MEINHERZ ETAL  3,237,746
TYPEWRITER DRIVE CAM HAVING ROUNDED ENGAGING SURFACE
Filed June 22, 1962  7 Sheets-Sheet 5

Fig. 6

INVENTORS
JOACHIM W. MEINHERZ
HARALD KOCH

BY
ATTORNEY

March 1, 1966    J. W. MEINHERZ ETAL    3,237,746
TYPEWRITER DRIVE CAM HAVING ROUNDED ENGAGING SURFACE
Filed June 22, 1962    7 Sheets-Sheet 7

INVENTORS
JOACHIM W. MEINHERZ
HARALD KOCH
BY
ATTORNEY

United States Patent Office 3,237,746
Patented Mar. 1, 1966

3,237,746
TYPEWRITER DRIVE CAM HAVING
ROUNDED ENGAGING SURFACE
Joachim Wilhelm Meinherz, Paderborn, and Harold Koch, Buchenhain, near Baierbrunn, Germany, assignors to Alpina Buromaschinen-Werk, G.m.b.H., Kaufbeuren, Allgau, Germany, a corporation of Germany
Filed June 22, 1962, Ser. No. 208,662
Claims priority, application Germany, July 6, 1961,
A 37,814
6 Claims. (Cl. 197—17)

The subject matter of the present application relates to a function drive for power-operated typewriters and similar machines employing a continuously rotating cylindrical driving roller, in particular one which is provided with a rubber or rubber-like coating, as well as an operating camplate capable of engaging the driving roller, and acting upon a function gear, such as a type-bar driving gear, a spacing mechanism, etc.

Conventional arrangements of this type incorporate a driving roller provided with a roughened rubber coating, and an operating camplate which is provided with a grooving on its running surface in order to ensure a reliable contact between the two elements, as well as sufficient power transmission from the driving roller to the respective function element. However, since especially in the case of typewriters, the number of working cycles is a very high one, there will result an early and considerable wear of the driving roller at those points where it engages each operating camplate. This local abrasion is still increased by the fact that for the purpose of regulating or adjusting the driving energy, the duration of the engagement between the operating camplate and the driving roller often is limited with the aid of limit stops. The operating camplate is suddenly pulled away from the driving roller during its movement. Just like during the establishment of the contact or engagement, there is caused a short high loading of the surface of the driving roller, because the grooving teeth of the camplate, engaging the rubber coating of the driving roller, effect a considerable expansion of the rubber which, consequently, shows the formation of cracks within the range of the sideway edges of the teeth.

In consequence thereof, the driving roller must be often replaced in such types of machines.

It is one object of the present invention to avoid the aforementioned disadvantage. This is chiefly accomplished in that the running surface of the operating camplate which is in engagement with the driving roller, has a smooth surface and is slightly arched in the direction of its swivel or turning axis, and in that the running surface consists of a plastic material having a friction coefficient which is equal or greater than 0.5.

It has proved that the friction between rubber on one hand, and smooth surfaces, e.g. of plastics or synthetic glass, on the other hand, is sufficiently high for transferring the necessary power. In the case of high speeds at both the beginning and the end of the engagement between the operating camplate and the driving roller, the smooth running surface of the operating camplate slides for preventing the stressed portions of the rubber coating from being torn out.

Accordingly, also the forceful braking of the driven parts, which may be caused e.g. in the case of the type-bar drive, on account of a type-bar disorder or entanglement, will no longer have a detrimental effect upon the driving roller. With respect to the type-bar drive this has the particular advantage that the drive may be effective throughout a larger range of the type-bar movement. The driving acceleration may be lower, in other words, the pitch angle of the camplate is smaller. On account of this the driving process proceeds softer and smoother by causing less noise, and at the same time, the wear is reduced.

In such types of driving systems it is also a problem to adjust and regulate the driving energy which is individually required for the respective function drive. In view of the fact that the tearing or pulling of the driving roller by the camplates with the aid of limit stops, results in the aforementioned disadvantage of causing a strong abrasion, there have already been proposed numerous complicated arrangements employing a continuously operating camplate, i.e. employing such types of camplates which are adjustable or variable with respect to their eccentricity for adjusting the energy. Other types of constructions employ adjustable buffers for destroying the excessive driving energy. In those cases the manually controllable step-by-step regulation of the driving energy may be effected by changing or varying the number of rotations of the driving shaft.

According to the invention, taking account that slippage between camplate and roller is now in no way detrimental to the roller, adjustment is obtained with the aid of an adjustable limit stop arranged within the range of motion of the lever arm carrying the operating camplate. This limit stop, moreover, is provided with an additionatl adjusting possibility for the purpose of regulating the driving energy.

One example of embodiment of the invention will now be described with reference to FIGS. 1–10 of the accompanying drawings, in which.

Figure 1A:
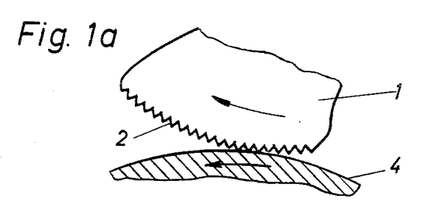
FIGS. 1a–1c show a grooved or knurled operating camplate of the conventional type as well as the way in which the camplate engages with the driving roller.
Figure 1B:
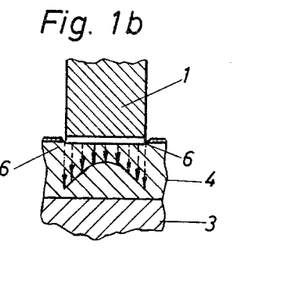
Figure 1C:
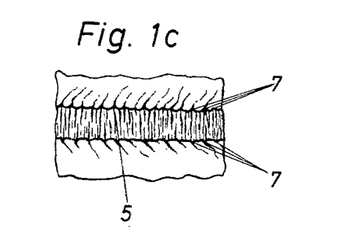

As soon as a conventional type of operating camplate 1 (FIGS. 1a, b) which, on its rolling surface, is provided with a grooving 2, engages a driving roller 3 provided with a rubber coating 4, considerable phenomena of wear will appear on the roller after a relatively short time. As shown in FIG. 1c, a running track is produced on the circumference of the roller which is due to the fact that the rubber surface is tangentially stressed during the engagement of the camplate. At the sideway edges 6 of the camplate 1, where the rubber is loaded to the greatest extent, there are produced cracks 7. These cracks reduce the resistivity of the surface, and the abrasion is increased to such an extent that a running track 5 will result after a relatively short period of time. In consequence thereof the distance relations during both the engagement and the disengagement are falsified, so that a replacement of the driving roller will become necessary. In addition thereto, and with respect to the type-bar gear arrangement, this very quickly causes a change of the striking intensity. This has a rather disturbing effect especially in view of the different striking intensities which are needed in practice, by reason of the different printing surfaces of the different types.

Figure 2A:
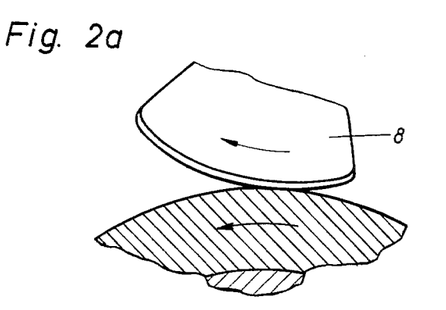
FIGS. 2a–2c show a camplate designed in accordance with the invention, as well as its engagement with the driving roller.
Figure 2B:
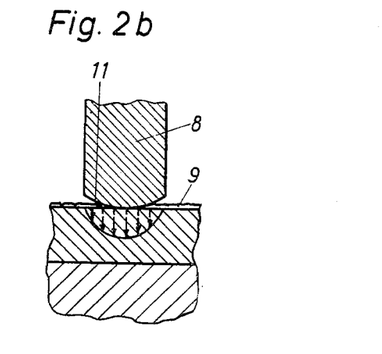

These disadvantages are avoided by designing the operating camplate in accordance with FIG. 2a. Experience has shown that a smooth and even polished surface of materials having, in contact with hard rubber, a friction poor ability of sliding on rubber. The intimate contact established between both of the surfaces is entailed by an adhesion. This is preferably the case with plastic materials having, in contact with hard rubber, a friction coefficient greater than 0.5, such as polystyrene and acrylglass. The operating camplate 8 as shown in FIGURES 2a and 2b consists of polystyrene, i.e., of an ABS-polymer+. It has a smooth running or rolling surface which is arched in the direction of the swivelling or rotating axis of the camplate. This arching provides a local intimate contact between the rubber surface and the surface of the camplate and passes through the thin film of dust and condensed water 9 normally existing on the circumference of the roller, during the engagement of the camplate. Otherwise this film of dust and condensed water 9 would act as a lubricating film, and would deteriorate the engaging conditions, i.e., would reduce the friction coefficient.

In addition thereto, the arched shape of the operating camplate serves to prevent the formation of pressure-tension peaks on the surface of the roller within the range of the edges of the operating camplates. The curves relating to the tension are shown by the dash-lined arrows in FIGS. 1b and 2b in case of the prior camplate and in case of the camplate according to the invention. Since high tensions appear at the edge of the camplate in the embodiment according to FIG. 1b, the FIG. 2b shows a continuous curve of the pressure tensions that reach their maximum in the centre of camplate.

Figure 2C:
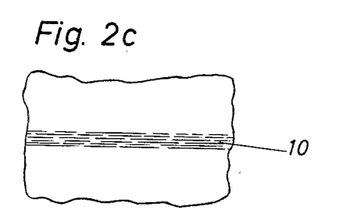

The material of the camplate is also chosen to have an abrasion resistance which is lower than that of the rubber coating of the driving roller. In this way, even throughout a very long period of time, and in spite of considerable loadings which are due to the initial accelerations during the engagement of the camplate, there hardly appears a wear of the driving roller. Experiments have shown that it is possible to carry out 100 millions of drive operating cycles with one driving roller, without the roller showing any formation of cracks; there merely became visible a slightly impressed and smoothed running track 10 (FIG. 2c).

In cases where such cooperating materials are chosen, the definitely greater wear is caused on the operating camplate, this however, being an actually wanted effect, because the operating camplate is more inexpensive in manufacture, and can be easily replaced. In addition thereto, in a typewriter, only certain function drives for example the functions corresponding to the letters "e" and "s" are used particularly often, whereas others are used to a considerably less extent. Since in view of these individual functions which are often used and are locally detrimental for the roller, the entire driving roller has to be often replaced in conventional machines, it is sufficient, in accordance with the present invention, to replace only the individual camplate assigned to the respective function drive which is used more frequently.

The arched portion 11 of the running surface of the camplate 8 moreover offers the advantage in the case of slight tilting of the camplate, which may be due to the unavoidable bearing clearance (slackness), of preventing the surface of the driving roller from being damaged. Within the range of this arched portion, the running surface continuously remains to be in engagement with the driving roller. For this reason it appears to be appropriate for the arched portion 11 to extend in a circular fashion, and that its radius is smaller than the smallest distance of the running surface of the operating camplate from its axis of rotation. Radii in the orders ranging from 8 to 15 mm. have proved to be of advantage.

The inventive type of function-drive device has proved to have a particularly favourable effect when being used as a type-bar driving system.

In a type-bar gear there appear high initial accelerations, and the number of operating cycles is a great one, so that particularly exacting demands are placed on the abrasion resistivity of the driving roller.

Figure 3:
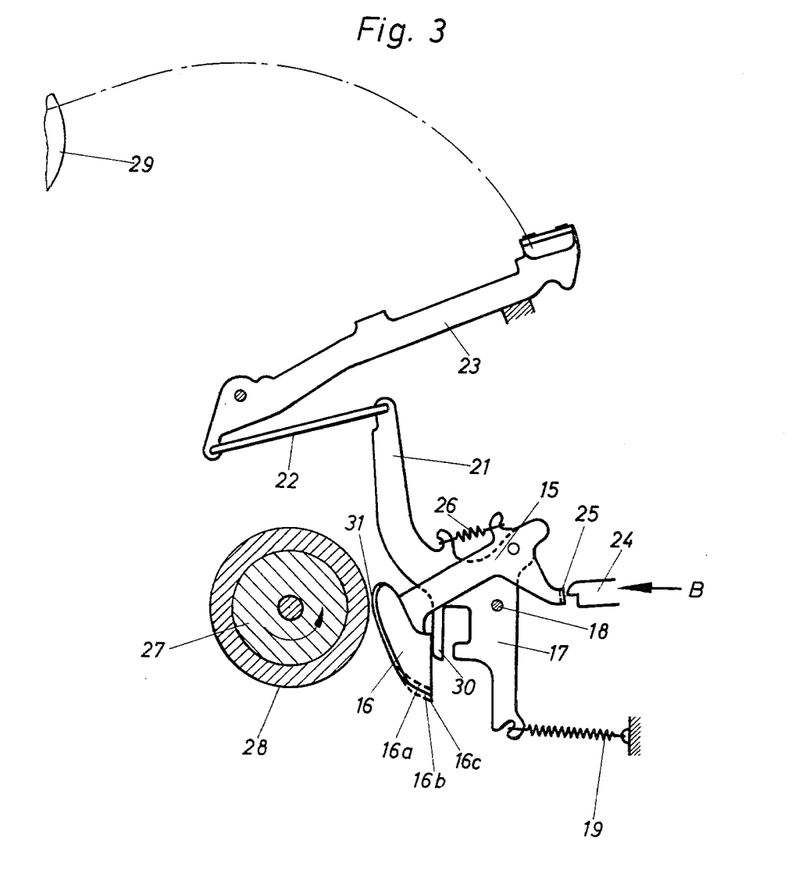
FIG. 3 shows a functional driving device for type-bar gears employing a camplate without limiting stops.

FIG. 3 shows a type-bar driving arrangement in which the driving lever 15 which carries an operating camplate 16 of the type described hereinbefore, is pivotably mounted on an intermediate lever 17. This intermediate lever 17, in turn, is arranged on a stationary shaft 18. With its top arm 21, this lever is connected via a pull rod 22, to a type bar 23. By actuating the key (not shown) a member 24 is displaced in the direction indicated by the arrow B, thus engaging an angularly bent portion 25 of the driving lever 15. The latter is turned clockwise in opposition to the action of a tension spring 26, in the course of which the operating camplate 16 is engaged to a driving roller 27. The rubber coating 28 of the driving roller rotating in the anti-clockwise sense, serves to take along the smoothly operating camplate, after a slight initial slippage, so that both the driving lever and the intermediate lever 17 are turned in the clockwise sense, and the type bar 23 is caused to strike the platen 29.

This striking intensity which is to be adapted to the striking surface of the type determined by the shape of the respective letter (character), is in the present case accomplished by selecting a variable length operating camplate 16. This may be achieved in that operating camplates 16a, 16b, 16c are manufactured with variable length camplate surfaces, in which case three different stages of length may already be sufficient. In accordance with the respectively required operating energy, these camplates are assigned to the respective type bars. In the given example the camplate 16c would e.g. be assigned to the letter m, and the camplate 16a to the full stop.

Thus, the operating camplate, in any case, can remain engaged throughout its entire running surface, for keeping the strain upon both the operating camplate and the driving roller extremely low. A regulation of the striking intensity may be effected in this type of embodiment, in the conventional manner, by varying the number of rotations of the roller.

For adjusting the engagement path of the operating camplate and, consequently, also the depth of depressing the keys for releasing a striking operation, there is used an arm 30 integral with the intermediate lever 17. By way of bending, this arm can be adjusted in such a way that the operating camlate 16 which is assigned thereto by the tension of the spring 26, will be provided, in its upper portion 31, with the proper spacing from the circumference of the driving roller.

When employing the inventive type of smooth, arched operating camplate consisting of an abrasion-resistant plastics, on the type-bar gear, it is no longer necessary, as up to now, to restrict the driving path of the type bar only to that particular portion of the range of motion in which no collision can appear between two or more type bars. In the known typewriting machines such a type-bar disorder frequently is the cause of damaging the driving roller, because the engaged camplates remaining stationary their grooving that engages the rubber coating will eat out the continuously rotating roller at the point of engagement. For this reason, in the known machines the driving path has been shortened, so that the driving camplates were not yet engaged in cases where the danger of a collision appeared.

By providing the smooth type of operating camplates there is greatly eliminated the danger of damaging the rollers. In the event of a sudden forceful braking of the operating camplate due to a type-bar disorder or an improper engagement of the gear, there is merely caused a slippage between the camplate and the roller, without causing the latter to be damaged thereby.

Accordingly, the driving path of the type bar may be extended, with the pitch of the camplate being smaller. This results in a soft and noiseless drive, in a reduction of the danger of the slipping in the case of a dusty driving roller, and in a longer lifetime due to the lower strain exerted upon the gear members.

Figure 4:
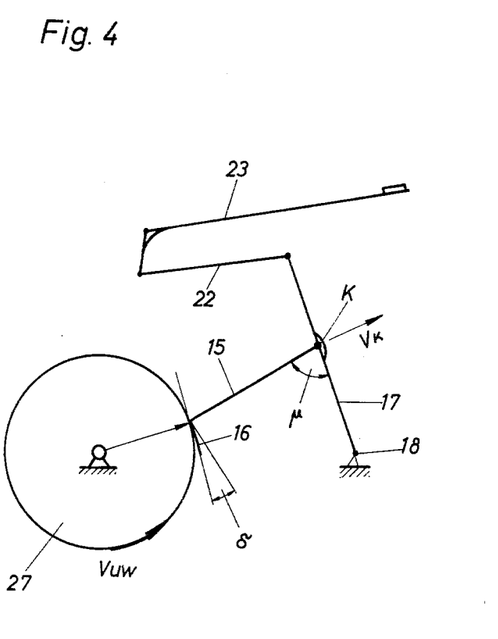
FIG. 4 shows in schematic form a gear arrangement relating to the arrangement of FIG. 3.

There is the following relationship between the operating speed $V_K$ (FIG. 4) at point K of the intermediate lever, and the circumferential speed $V_{UW}$ of the shaft:

$$V_K = V_{UW} \cdot \frac{\sin \delta}{\sin \mu}$$

wherein $\delta$ is the pitch angle of the camplate with respect to the roller, and $\mu$ the angle of transfer between the driving lever and the intermediate lever. Moreover, there is the condition that the angle $\delta$ may not be greater than the angle the tangent of which corresponds to the coefficient of friction of both the shaft and the camplate surfaces.

Since for the purpose of constructional reasons, the angle $\mu$ may not be designed very small, and because the angle $\delta$ should remain small for the aforementioned reasons, it is advisable, for the purpose of achieveing a sufficiently high operating speed, to increase the circumferential speed of the driving roller. As already mentioned hereinbefore, a slippage occurring between the roller and the camplate on account of the initial and the final acceleration, during the engagement, no longer has a detrimental effect upon the roller on account of the inventive design of the operating camplate. For this reason it is possible, without further ado, to provide a small pitch angle $\delta$, and a high circumferential roller speed $V_{UW}$. From this there will result the advantage that with respect to high-speed function gears which are driven by the driving roller via a single-revolution clutch, there is no longer required an additional transmission gear, and also the reduction gear between the electromotor and the shaft can be simplified.

By increasing the circumferential speed $V_{UW}$ of the driving roller 27 it is further possible to keep the pitch angle $\delta$ small, i.e., substantially smaller in comparison with the friction angle, so that the latter is only slightly utilized, and the friction coupling will operate reliably in all cases, because also in the case of any probably existing soilings or deposition of condensed water, the friction coefficient value will not drop below the tangent of the pitch angle $\delta$.

Figure 5:
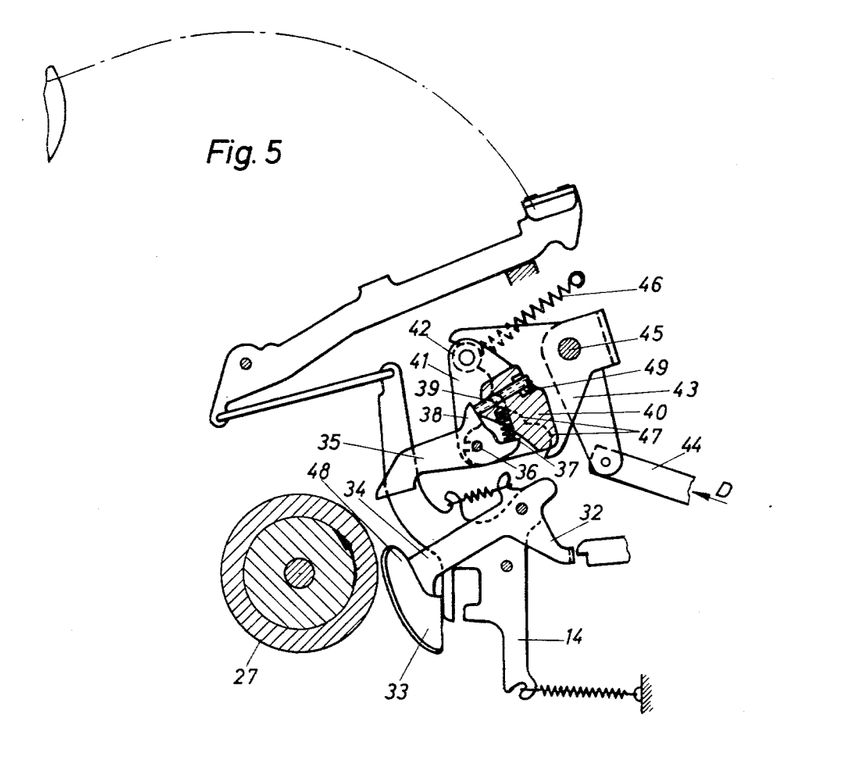
FIG. 5 shows a type-bar gear incorporating a limited engagement of the operating camplate which is capable of being adjusted and regulated.

FIG. 5 shows another example of embodiment of a type-bar urging or driving arrangement. In this gear which, with respect to its construction, substantially resembles the arrangement of FIG. 3, the driving energy is adjusted and regulated by way of a timely restriction of the engagement between the operating camplate 33 and the driving roller 27. Within the path of a lever arm 34 carrying the camplate, forming part of the driving lever 32, there is arranged a limit-stop lever 35. This stop lever is capable of being turned about a stationary shaft 36, and is pressed, by the action of a spring 37, with its nose portion 38 against an adjusting screw 39 which is arranged in a supporting rail 40. At its end this supporting rail 40 is secured to a plate 41 which, on its rear side, carries a roller 42 that is caused to engage an engaging camplate 43 with the aid of a spring 46. This engaging camplate 43 which is capable of being turned about a shaft 45 by the action of a rod 44 that is capable of being moved in the direction indicated by the arrow D, is provided with engaging rounded notches 47 which are arranged at different distances from the centre of rotation. When turning the engaging camplate 43 in the clockwise sense, the supporting rail 40 is likewise turned in a step-by-step manner in the clockwise direction.

If an operating camplate 33 is engaged in the described way to the driving roller 27, then its coupling is effected up to that particular point where the upper edge 48 of the camplete meets against the lever 35. Between the camplate 33 and the driving roller 27 there is caused a certain slippage which, however, has no detrimental effect on account of the smooth surface of the camplate. Thereupon the camplete is disengaged from the driving roller on account of the swing actuation of both the intermediate lever and the type bar due to their own speeds and inertias.

The position of the lever 35 and, consequently, the duration of the engagement between the camplate and the roller is adjusted by setting the screw 39 in accordance with the necessary driving energy being determined by the size of striking surface of the type carried by the type bar; an elastic insert 49 made of rubber like material avoids unscrewing of the screw.

It is of advantage in this arrangement that the adjusting device is accessible from the front side of the machine. The adjustment may be performed without having to tilt the machine.

A regulation of the striking intensity, e.g. for producing a different number of carbon copies, is effected by way of adjusting a not shown control device which, via the rod 44, serves to displace or turn the engaging camplate 43. In this way the supporting rail 40 and all the screws 39 are turned out of their position, for changing the position of the levers 35.

Figure 6:
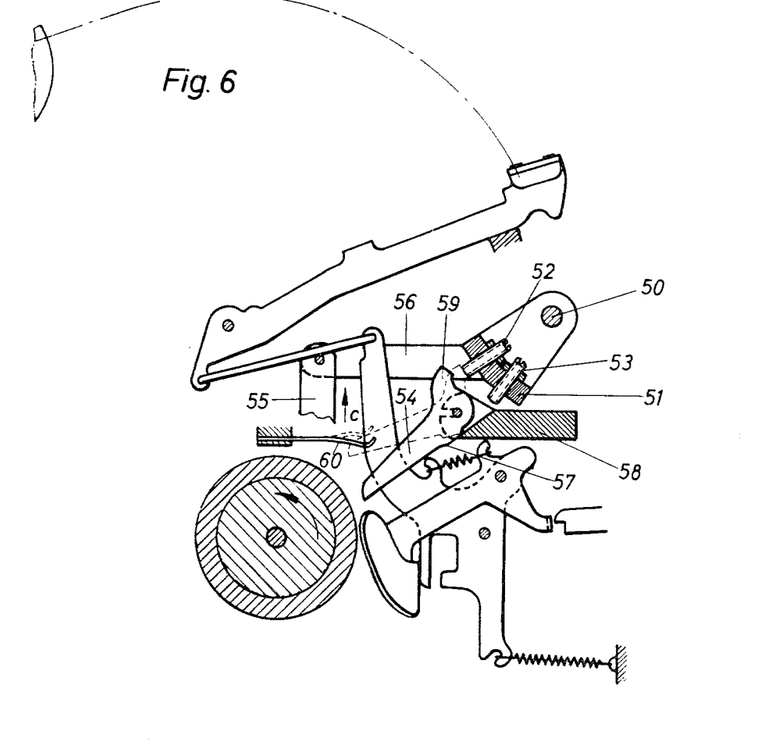
FIG. 6 shows a type-bar gear with a limited engagement of the operating camplate as well as an adjustable striking intensity in both the normal and the switchover position.

Another possible embodiment of the adjusting device described hereinbefore, is shown in FIG. 6. With the aid of this arrangement it is possible to adjust the striking intensity with respect to the types that are to be printed in the normal position (small letters), and also with respect to the types that are to be printed in the switchover position (capital letters). For each type-bar gear or lever arrangement, two adjusting screws 52, 53 are arranged in an adjusting rail or bar 51 which is capable of being turned round a stationary shaft 50, with these adjusting screws 52, 53 serving as a back-stop for the stop lever 54 which has already been described in connection with FIG. 5. In the normal position the screw 52 is within the range of action of the nose 59 of this stop lever 54, whereas upon switchover, the adjusting rail or bar 51 is turned in the clockwise direction, so that now the screw 53 will be within the range of action of the nose 59. The turning or horizontal swinging of the rail or bar 51 is effected via a rod 55 which is coupled to the switchover device of the typewriter, and which is displaced thereby in the direction indicated by the arrow C. The rod 55 is flexibly connected to a strap 56 mounted to the bar or rail 51. Accordingly, upon each switchoever, also the striking intensity is individually adapted to the type which is to be printed.

In this arrangement the stop levers 54 are arranged to be freely pivotable, and with their own weight they are applied to a back stop 57 provided at the guiding and supporting comb 58. Only after an operating camplate has met against the stop lever 54, the latter is pressed with its actuating portion or nose 59 against the corresponding ajdusting screws 52, 53. In this way there is obtained a simple and inexpensive bearing of the limiting levers.

For the purpose of providing a softer or smoother disengagement of the operating camplate, it is possible to provide a flat spring comb, comprising one flat spring 60 for each stop lever 54, against which the lever 54 meets during the last stage of its swivel motion. The friction impact acting upon the driving roller is thus dampened, and the camplate is gradually disengaged.

Figure 7:
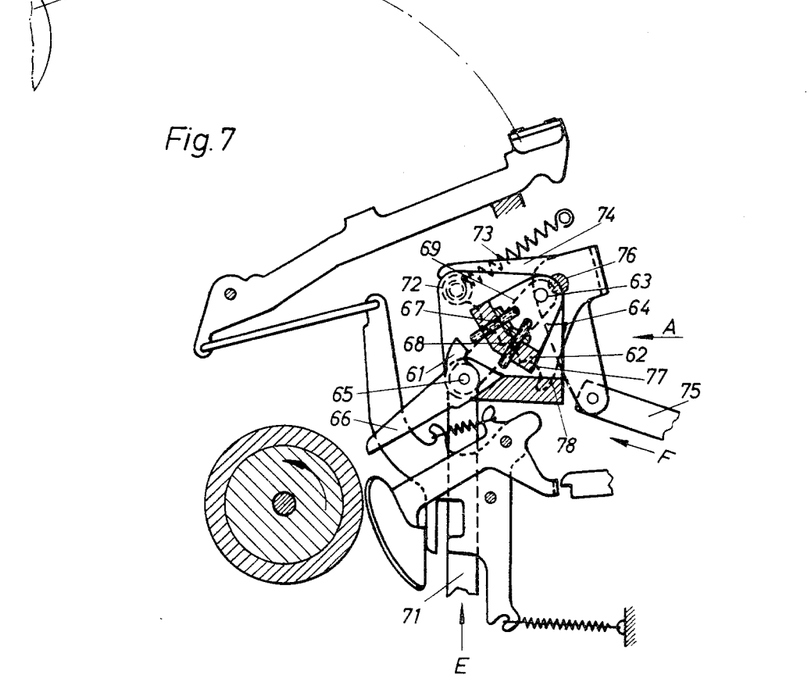
FIG. 7 shows a type-bar gear with a limited engagement of the operating camplate, as well as a striking intensity capable of being adjusted and regulated, in both the normal and the switchover position.
Figure 8:
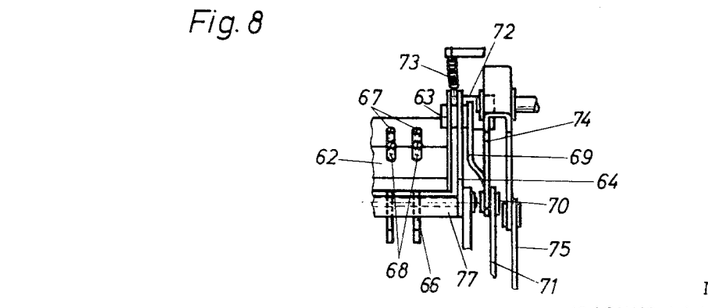
FIG. 8 is a partial view of the arrangement according to FIG. 7 viewed in the direction indicated by the arrow A.

FIGS. 7 and 8 show a perfection of the arrangement of FIG. 6 in which the striking intensity is adjustable with respect to the normal as well as to the switchover position, and which, on the other hand, is also capable of being regulated as a whole.

An adjusting bar 62 corresponding to the bar 51 in FIG. 6, provided with two adjusting screws 67, 68 per type-bar lever arrangement, is arranged on a plate 64 and is capable of being turned or pivoted around a roller 63, with the said plate 64, in turn, being capable of rotating about a shaft 65 carrying the stop levers 66.

The stop levers 66, with respect to their effect, resemble the stop levers 35 described in connection with FIG. 5. On the rear side of the plate 64, with respect to FIG. 7, a lever 69 is fast with the roller 63, and is coupled, via a pivot 70 (FIG. 8), to a pull rod 71. Appropriately, the arrangement is made in such a way that the pivot 70 will correspond to the position of the shaft 65, in other words, that it will form a geometrical axis therewith.

When the segment (not shown) carrying the type levers is shifted, the rod 71 is displaced in the conventional manner in the direction indicated by the arrow E, on account of which the adjusting bar or rail 62 performs a clockwise horizontal swing until the adjusting screw 68 which is assigned to the switchover position, has assumed its limiting position in relation to the lever 66. To the plate 64 there is mounted a roller 72 with the aid of which the plate 64, by the action of a spring 73, is pulled against an engaging camplate 74 which is as previously described for the plate 43 (FIG. 5) provided with notches 77 and which is capable of being pivoted about an axis 76 by the action of a rod 75 which is moved in the direction indicated by the arrow F. This engaging camplate 74, as already described with reference to FIG. 5, serves to regulate or adjust the limit stops, by effecting a horizontal swing of the plate 64 in the clockwise direction, with the guide comb 78 pivoting about the shaft 65 and serving as a back-stop for the stop levers 66, so that, consequently, also the stop levers 66 are caused to perform a horizontal swing about their common axis of rotation in the clockwise direction. Accordingly, with the aid of the not shown selecting means which are connected to the rod 75, besides providing a possibility for adjusting the striking intensity of the type bar in both the normal and the switchover position, it is also possible to perform a regulation of the striking intensity with respect to the printing operation in both positions.

Figure 9:
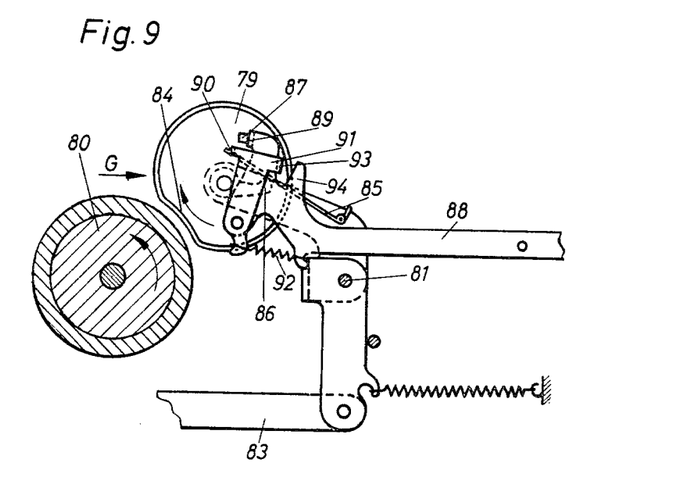
FIG. 9 shows a functional driving device employing a rotating operating camplate.
Figure 10:
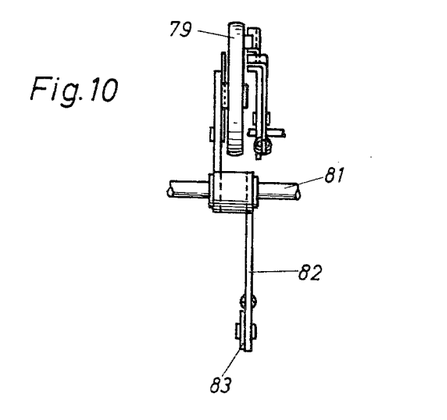
FIG. 10 shows the arrangement according to FIG 8 when looked at in the direction indicated by the arrow G.

The invention, however, is in no way restricted to the driving or urging of type bars only. In the way as described hereinbefore it is also possible to design any other types of function drives, such as the space-bar stepping mechanism or the carriage return. FIGS. 9 and 10 show part of a function drive for effecting a spaced or step-by-step feed of the paper carriage. The driving energy is derived, via a rotating operating camplate 79, from the motor driven roller 80. On a shaft 81 there is pivotably arranged a driving lever 82 to the arm of which there is rotatably arranged the operating camplate 79 having a smooth and arched circumference. The other end of this lever is in a flexible engagement with a switching rod 83. The operating camplate is designed like an eccentric disk provided with an indented portion 84 adapted to be engaged by the circumference of the driving roller 80 in a contactless manner.

By the action of a spring 85 pressing upon a lever 86 which is connected to the camplate, the camplate itself is brought through the boss 87, into contact with an angle 89 forming part of the releasing lever 88. Upon actuating the space bar, the releasing lever 88 is turned in the clockwise direction, so that the boss 87 is released and the camplate 79, by the action of the spring 85, is turned to such an extent in the clockwise direction that it will engage with the driving roller, for the purpose of being taken along thereby.

After one complete rotation the camplate is stopped due to the fact that its boss 87 has met against the angle 89, provided that the lever 88 has already reassumed its normal position. If this is not the case, the boss 87 will meet against an angle 90 of a pawl 91 carried by the releasing lever 88, for turning the latter in opposition to the tension of a spring 92, until a further angle 93 of the boss 87 will be lying in front of the engaging surface of the pawl 91 will meet against an arm 94 of the lever 88. In this position the supporting or engaging surface of the angle 89 by a slight rotation angle, so that the lever 88 is freely permitted to return to normal. The movement transferred to the rod 83 during the rotation of the camplate, serves to actuate the space bar stepping mechanism.

While we have described above the principles of our invention in connection with specific apparatus, it is to be clearly understood that this description is made only by way of example and not as a limitation to the scope of our invention as set forth in the objects thereof and in the accompanying claims.

What we claim is:

1. In a typewriting machine the combination of a continuously rotating driving roller having a coating of rubber-like material; an intermediate type-bar controlling lever; a camplate pivotally carried by said intermediate lever, said camplate having a convex eccentric portion adapted for tangentially engaging said roller, the engaging surface of said portion being hard polished, transversely arched and made of plastic material having in contact with said rubber-like material an abrasion resistivity substantially less than said rubber-like material; spring means acting between said camplate and said intermediate lever for urging said camplate out of engagement with said roller in rest position of said intermediate lever; means for rotating said camplate to engage said roller; and abutting means for limiting the travel of said camplate during engagement with said roller, said abutting means comprising an abutment member located in the pivotal path of said camplate at a position whereby said member abuts said camplate while said camplate is still in contact with said roller and is being driven thereby.

2. The combination according to claim 1, wherein said abutting means is a stop lever an arm of which cooperates with said camplate and further comprising in the upper front portion of said typewriting machine a stationary shaft pivotally supporting the set of said stop levers corresponding to the different type-bars; a comb-guide member for said stop levers pivotally carried by said shaft; a further elongated member carried by said comb member in pivotal relationship parallel to said shaft; a pair of adjustable screws passing through said further member and located in the same plane perpendicular to said shaft for providing alternate abutment means for each stop lever; means for imparting an angular displacement to said further member and commuting abutment operativeness of said screws; and means adapted for stepwise rotative displacement of said comb member for preventing rotation of the latter about said shaft.

3. The combination of claim 1, wherein said intermediate lever comprises an adjustable tongue, said spring means pivotably urging said camplate in a direction opposite to that in which said camplate is driven by said roller and against said tongue.

4. In a typewriting machine the combination of a continuously rotating driving roller having a coating of rubberlike material; an intermediate type-bar controlling lever; a camplate pivotally carried by said intermediate lever, said camplate having a convex eccentric portion adapted for tangentially engaging said roller, the engaging surface of said portion being hard polished, transversely arched and made of plastic material having in contact with said rubber-like material an abrasion resistivity substantially less than said rubber-like material; spring means acting between said camplate and said intermediate lever for urging said camplate out of engagement with said roller in rest position of said intermediate lever; means for rotating said camplate to engage said roller; and abutting means for limiting the travel of said camplate during engagement with said roller, and wherein said abutting means is a stop lever, an arm of which cooperates with said camplate and further comprising in the upper front portion of said typewriting machine a stationary shaft pivotally supporting the set of said stop levers corresponding to the different type-bars; an elongated member co-extentially extending with said shaft and pivoted about the latter; an adjustable screw passing through said member and providing an abutment for each said stop levers; and means for preventing rotation of said elongated member about said shaft.

5. The combination according to claim 4, wherein said means preventing rotation of said elongated member are adapted for stepwise rotative displacement of said member.

6. In a typewriting machine, the combination of a continuously rotating driving roller having a surface coating of rubber-like material, a function drive operating camplate pivotably mounted on an intermediate lever and having a cam surface adapted to frictionally engage the surface of said driving roller, both said surfaces being smoothly curved and free of any tread whereby rotary slippage may smoothly occur between said surfaces, said camplate surface having a continuous longitudinal convexity from end to end thereof which permits only tangential contact between said cam and roller regardless of the pivotal position of said camplate relative to said intermediate lever and relative to said roller, said camplate surface also being transversely convex from side to side of said camplate, said camplate surface having an abrasion resistivity lower than that of said roller surface.

References Cited by the Examiner

UNITED STATES PATENTS

| | | | |
|---|---|---|---|
| 516,489 | 3/1894 | Hunt | 308—237 |
| 2,223,235 | 11/1940 | Thompson | 197—17 |
| 2,506,444 | 5/1950 | Dodge. | |
| 2,638,199 | 5/1953 | Schremp | 197—17 |
| 2,685,483 | 8/1954 | Morra | 308—237 |
| 2,717,685 | 9/1955 | Buhler | 197—17 |
| 2,734,613 | 2/1956 | Kennedy et al. | |

FOREIGN PATENTS

| | | |
|---|---|---|
| 522,298 | 3/1955 | Italy. |

ROBERT E. PULFREY, *Primary Examiner.*

ROBERT A. LEIGHEY, *Examiner.*

ROBERT T. CUNNINGHAM, EDGAR S. BURR,
*Assistant Examiners.*